(12) United States Patent
Lundman

(10) Patent No.: US 6,899,138 B2
(45) Date of Patent: May 31, 2005

(54) FLEXIBLE EMERGENCY GAS PIPELINE PLUG

(76) Inventor: Philip L. Lundman, 3631 Fredonia Kohler Dr., Fredonia, WI (US) 53021

(*) Notice: Subject to any disclaimer, the term of this patent is extended or adjusted under 35 U.S.C. 154(b) by 0 days.

(21) Appl. No.: 10/731,226

(22) Filed: Dec. 9, 2003

(65) Prior Publication Data
US 2004/0144439 A1 Jul. 29, 2004

Related U.S. Application Data
(60) Provisional application No. 60/431,855, filed on Dec. 9, 2002.

(51) Int. Cl.[7] .............................. F16L 55/12
(52) U.S. Cl. .................... 138/93; 138/98; 138/97; 138/94; 137/15
(58) Field of Search ................... 138/93, 98, 97, 138/90, 91, 94; 137/15, 317, 318

(56) References Cited

U.S. PATENT DOCUMENTS

| | | | |
|---|---|---|---|
| 3,842,864 A | * 10/1974 | Riegel et al. | 138/93 |
| 4,291,727 A | * 9/1981 | Yie et al. | 138/93 |
| 4,365,649 A | * 12/1982 | Jones | 138/93 |
| 4,413,653 A | * 11/1983 | Carter, Jr. | 138/89 |
| 4,423,754 A | * 1/1984 | Carter, Jr. | 138/93 |
| 4,436,120 A | * 3/1984 | Josien et al. | 138/93 |
| 4,458,721 A | * 7/1984 | Yie et al. | 138/93 |
| 4,514,447 A | * 4/1985 | Boxmeyer | 428/36.3 |
| 4,565,222 A | 1/1986 | Lundman | |
| 4,614,206 A | * 9/1986 | Mathison et al. | 138/93 |
| 4,995,761 A | * 2/1991 | Barton | 405/184.1 |
| 5,353,842 A | 10/1994 | Lundman | |
| 5,901,752 A | 5/1999 | Lundman | |
| 6,276,398 B1 | * 8/2001 | Lange | 138/98 |
| 6,446,669 B1 | 9/2002 | Lundman | |

* cited by examiner

Primary Examiner—Patrick Brinson
(74) Attorney, Agent, or Firm—Michael Best & Friedrich LLP (57) ABSTRACT

An apparatus for stopping a high pressurized fluid from escaping a rupture in a pipeline including a support member having a first end, a second end, and an outer surface, an inner inflatable bladder, an outer material layer, and an inflation hose. The inner inflatable bladder sealingly engages the first end and the second end of the support member and substantially covers the outer surface of the support member. The inner inflatable bladder includes a material layer substantially impermeable to fluid. The outer material layer substantially encases the inner inflatable bladder and sealingly engages the first end and the second end of the support member. The outer layer is formed of a woven fabric material capable of withstanding high inflation pressures of approximately 100 psi. The inflation hose supplies pressurized fluid between the outer surface of the support member and the inner inflatable bladder.

28 Claims, 5 Drawing Sheets

FLEXIBLE EMERGENCY GAS PIPELINE PLUG

RELATED APPLICATIONS

The present patent application claims the benefit of prior filed provisional patent application Ser. No. 60/431,855, filed on Dec. 9, 2002, the entire contents of which are hereby incorporated by reference.

BACKGROUND OF THE INVENTION

The invention relates to methods and apparatus for repair of pipes, pipelines or conduits where the pipe has been cracked or broken. More particularly, the invention is directed to methods and apparatus for repairing a break or crack in a natural gas pipeline where the pipeline may contain fluids under pressure in the range of 120 psi or more.

SUMMARY OF THE INVENTION

In one construction, the invention provides a method and apparatus to provide emergency internal stopping of natural gas or other gas or liquid escaping from a rupture or break in a pipeline.

In another construction, the invention provides for the insertion of an inflatable plug into a ruptured pipeline through a hot tap either upstream or downstream of the rupture or break in the pipeline. The inflatable plug is impermeable and chemically resistant to natural gas or other gas or liquid in the pipeline. The inflatable plug also may provide for bypass of gas flow through the plug to allow continuous supply of gas to customers downstream of the break or rupture. The inflatable plug is also flexible to allow installation around bends and pipe and also when in the inflated state can conform to the shape of a damaged pipe to securely seal the damaged pipe. The inflatable plug is also constructed such that it can be used repeatedly in multiple repair operations. Additionally, the inflatable plug is sufficiently small and flexible that it can be quickly inserted into a pipeline and quickly inflated to provide for immediate seal and repair of the pipeline.

In a further construction, the plug can provide a vehicle to carry a resin impregnated repair sleeve to the rupture point and act as a packer to permit expansion of the repair sleeve against the rupture to provide for a permanent seal and repair of the rupture from the inside of the pipeline.

In a further construction, the inflatable plug can include multiple plugs inserted in series for testing the repair area or other sections of the pipeline between the inflatable plugs.

DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting and coupling.

Figure 1:
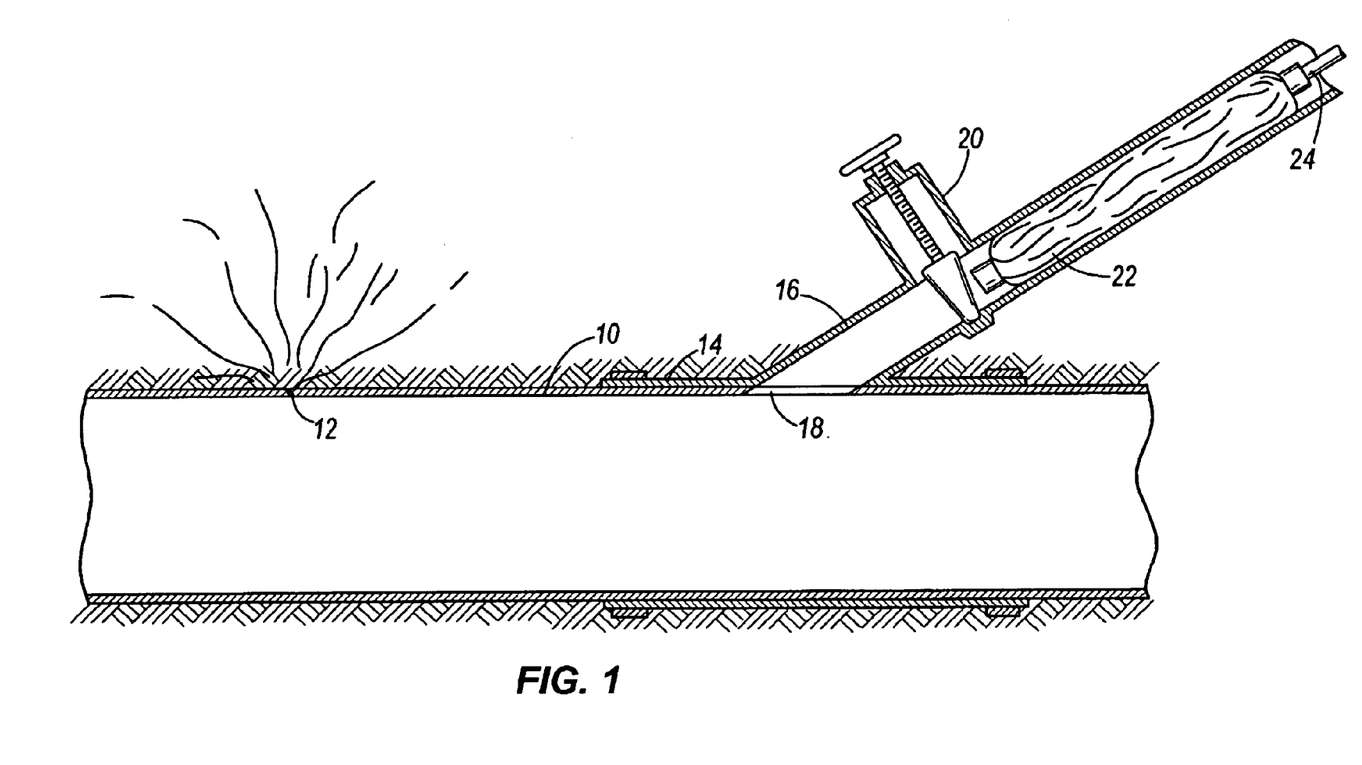
FIG. 1 is an elevation view of a pipe sealing apparatus, and shown being inserted in a section of a pipeline.

FIG. 1 illustrates a method and apparatus of the invention for use in repair of a natural gas pipeline 10 or other fluid flow pipeline of the type subjected to high pressures. In one construction, such as the construction shown in FIG. 1, repair of a break or crack 12 in a natural gas pipeline 10 can be accomplished by first attaching a saddle 14 around the pipe 10 at a location on the pipe either upstream or downstream from the break 12 in the pipeline 10. The saddle 14 can be clamped around the pipe 10 or welded to the pipe 10. The saddle 14 supports a tap or transverse pipe 16. In the illustrated arrangement, the transverse pipe 16 can be welded to the saddle at an acute angle with respect to the longitudinal axis of the pipeline 10. In the construction shown in FIG. 1, the transverse pipe 16 is positioned at an angle of about 30° with respect to the longitudinal axis of the pipeline 10. In other constructions, such as, for example, the construction shown in FIG. 5, the transverse pipe 16 can be positioned at 90° with respect to the longitudinal axis of the pipeline 10. In further constructions, the transverse pipe 16 can be positioned at another angle.

A machining tool or drill can then be extended into the transverse pipe 16 and used to drill an aperture or hole 18 in the sidewall of the pipeline 10 creating an opening in the pipeline 10. The transverse pipe 16 is provided with a valve assembly 20 to permit withdrawal of the drill and closing of the transverse pipe 16.

A pipe sealing apparatus or inflatable plug 22 can then be inserted into the end of the transverse pipe 16. The elongated flexible plug 22 can be connected to a relatively stiff but flexible hose 24. A conventional air pressure hose 24 is suitable for use in attachment to the inflatable plug 22. The valve 20 is then opened and the inflatable plug 22 can be forced into the pipeline 10 and pushed along the pipeline 10 until it is positioned at the location of the break 12 in the pipeline 10 to be repaired.

Figure 2:
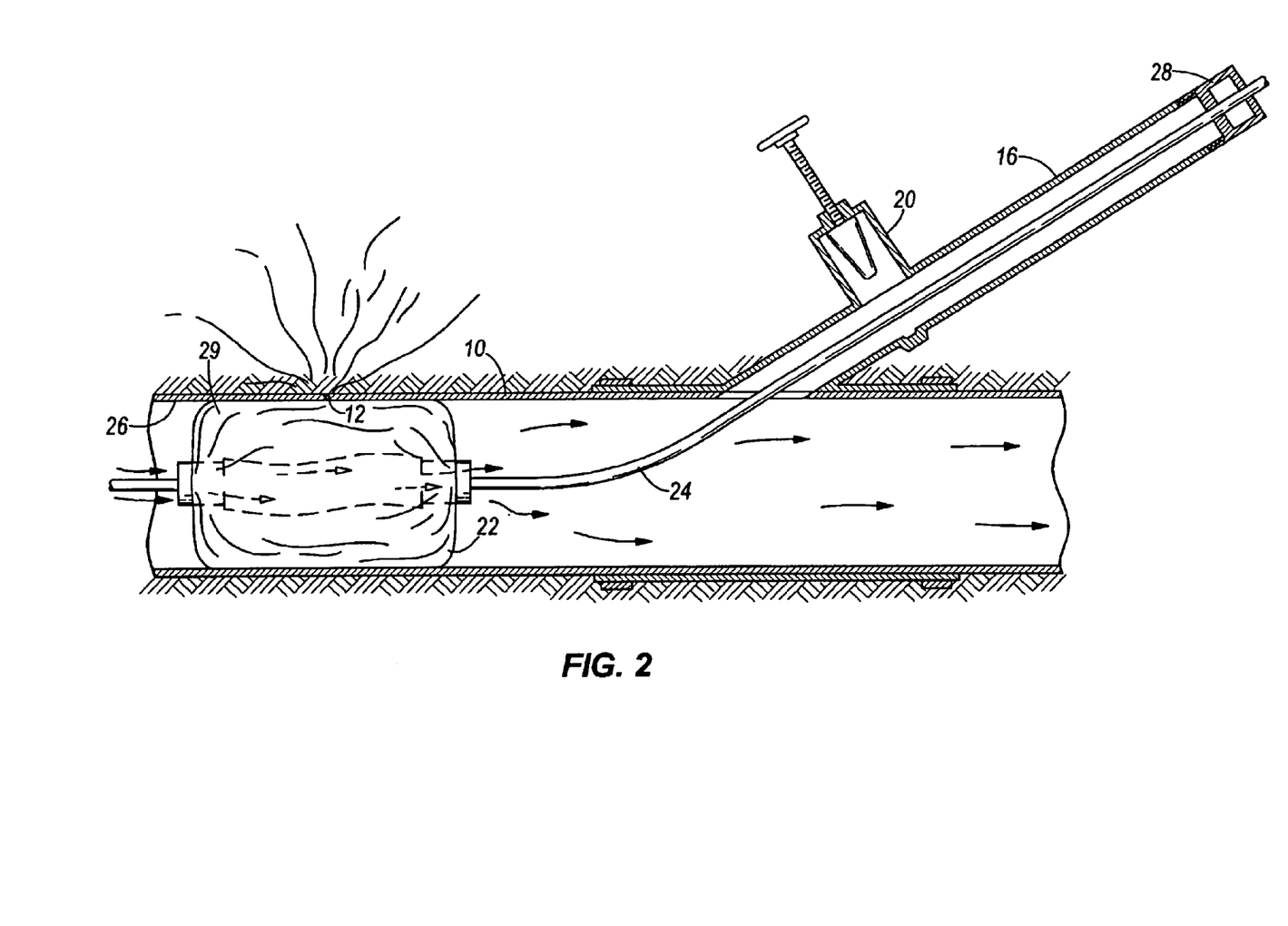
FIG. 2 is a cross-sectional elevation view of a pipe sealing apparatus, such as the pipe sealing apparatus shown in FIG. 1, and shown inserted in a section of a pipeline and in an inflated state.

As shown in FIG. 2, the inflatable plug 22 can then be inflated with air or liquid under pressure until the outside surface of the inflatable plug 22 engages the inside surface or wall 26 of the pipeline 10 in the area of the break 12 to thereby plug the leak in the pipeline 10. In some constructions, the inflatable plug 22 may need to be inflated to approximately 140% of the ambient pressure inside the pipeline 10 in order for the plug 22 to expand. In other constructions, the inflatable plug 22 may need to be inflated to approximately 150% of the ambient pressure inside the pipeline 10 or approximately 160% of the ambient pressure inside the pipeline 10. For example, the pipeline 10 can have an ambient pressure of approximately 60 psi. For this example, the inflatable plug 22 may need to withstand inflation pressures of approximately 100 psi. In some constructions, the inflatable plug 22 may even need to withstand inflation pressures of approximately 125 psi or greater.

As also shown in FIG. 2, a cap 28 can sealingly surround the flexible hose 24 and cap the end of the transverse pipe or tap 16.

In one form of the method of the invention, the area around the break or crack 12 in the pipeline 10 can then be excavated and exposed. A conventional sleeve or saddle can be placed around the broken section of pipe 10 to seal the break 12. The seal may comprise multiple layers or material wrapped around the pipe 10 and then securely held in place by a steel sleeve. The sleeve may be bolted in place, welded or otherwise securely clamped around the layers of sealing material. The sleeve may also be held in place by using heat shrinkable material.

In another construction, the plug 22 can act as a vehicle to carry a curable material patch or a resin impregnated repair sleeve to the rupture point 12 in the pipeline 10. The plug 22 can further act as a packer to permit expansion of the patch or repair sleeve against the rupture or break 12 to provide for a permanent seal and repair of the rupture 12 from the inside of the pipeline 10. In this construction, the patch or repair sleeve may be wrapped around the inflatable plug 22 and then positioned in the area of the break 12 with the inflatable plug 22. The patch or repair sleeve can then be forced against the inside surface 26 of the break 12 in the pipeline 10 by inflation of the inflatable plug 22. The curable material patch or repair sleeve can then be allowed to cure or seal in place to seal the rupture 12. The curable patch can be a heat curable material cured by forcing hot gas or steam into the inflatable plug. Alternatively, the curable patch can be curable by the application of pressure of the inflatable plug 22 against the sidewall of the pipeline 10.

Figure 8:
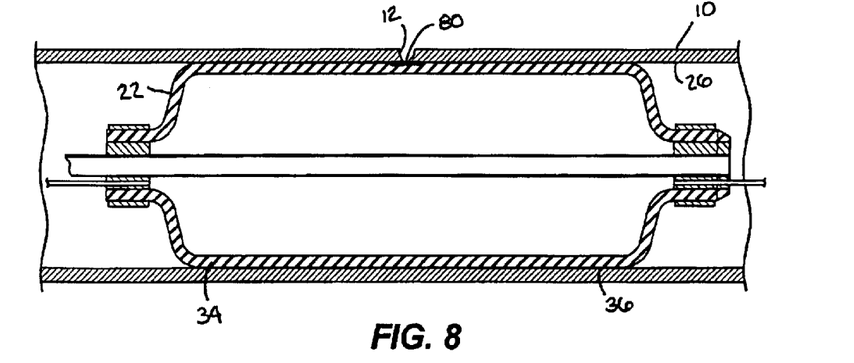
FIG. 8 is a cross-sectional elevation view of another pipe sealing apparatus, and shown inserted in a section of a pipeline and in an inflated state.

For example, FIG. 8 illustrates an inflatable plug 22 including a curable material patch 80. As shown, the inflatable plug 22 can act as a vehicle to carry the curable material patch 80 or a resin impregnated repair sleeve to the rupture point 12 in the pipeline 10.

In some constructions, the pipeline 10 illustrated in FIGS. 1–6 can have an inside diameter of approximately 6". In another embodiment of the invention, the method and apparatus of the invention could be used to repair pipes having a diameter as small as 1" or as large as 36" or larger.

In some constructions, the inflatable plug 22 can include multiple layers of material with opposite ends clamped around a support member 28 by metal bands 30. More particularly, the inflatable plug 22 can include an inner layer or bladder 32 of resilient fluid impermeable material. In some constructions, the inner bladder layer 32 can include a layer of fluid impermeable material such as rubber. More particularly, the inner bladder layer 32 can be formed from fluid impermeable material such as, for example, polyurethane, Nitrile, ethylene propylene (EPDM), neoprene, and Buna-N.

In some constructions, the inner bladder layer 32 can be encased or surrounded by one or more outer layers 34 of high strength woven fabric materials such as, for example, 400-denier ballistic nylon, Kevlar or another suitable high strength material. For example, the one or more outer layers 34 can include a first layer of high strength woven fabric material and a second layer of high strength woven fabric material. The first layer and the second layer can each be formed by the same material, such as, for example, one of 400-denier ballistic nylon or Kevlar. Alternatively, the first layer can be formed from a first material, such as, for example, one of 400-denier ballistic nylon or Kevlar, and the second layer can be formed from a second material, such as, for example, the other of 400-denier ballistic nylon or Kevlar. In some constructions, the one or more outer layers 34 can include additional layers of woven fabric formed from the same material described above or formed form different material than the first and second layers described above. The layers 34 of high strength fabric material are intended to support the inner bladder 32 and to permit the inflatable plug to withstand high inflation pressures. In some constructions, the inflatable plug 22 can withstand inflation pressures of approximately 100 psi. In other constructions, the inflatable plug 22 can withstand inflation pressures of up to approximately 125 psi or more.

In some constructions, the one or more high strength fabric layers 34 can each be covered by a protective layer 36. In other constructions, the outermost fabric layer 34 (if the outer layer 34 includes more than one fabric layer) may be covered by the protective layer 36. In some constructions, the protective layer 36 can be formed from a material that is resistant to deterioration from methane gas, such as, for example, Nitrile, polyurethane or other suitable materials. The protective layer 36 can also be formed from a material impermeable to fluid, such as, for example, polyurethane, Nitrile, ethylene propylene (EPDM), neoprene, and Buna-N. In some constructions, the protective layer 36 can protect the inflatable plug 22 from deterioration caused by the effects of natural gas or methane on the fabric. In some constructions, the protective layer 36 can allow the plug 22 to seal against the inner wall 26 of the pipeline 10.

In the illustrated constructions, the inflatable plug 22 can include four layers; an inner bladder layer 32, two woven fabric outer layers 34, and a protective layer 36. In these constructions, a second woven fabric outer layer 34 may substantially cover a first woven fabric outer layer 34. The inner bladder layer 32 can include a layer of polyurethane coated on the first woven fabric outer layer 34. The first woven fabric outer layer 34 can include a layer of 400-denier ballistic nylon. The second woven fabric outer layer 34 can include a layer of 400-denier ballistic nylon, and the protective layer 36 can include a layer of polyurethane coated on the second woven fabric outer layer 34. In some constructions, the first woven fabric outer layer 34 or the second woven fabric outer layer 34 can be a layer of one or more straps, as discussed below.

In some constructions, the inflatable plug 22 can be further strengthened by adding the use of Kevlar or metal alloy straps to the fabric layers 34 or can replace one of the woven fabric layers 34 with a layer of straps. In some constructions, the straps can be included in between the fabric layers 34, such as, for example, the straps may be positioned in between a first fabric layer and a second fabric layer. In other constructions, the straps can be positioned in between the outermost fabric layer 34 and the protective layer 36, positioned in between the one or more outer layers 34 and the inner bladder layer 32, or positioned in another suitable manner. In some constructions, one or more straps can extend circumferentially around the plug 22, and other straps can extend lengthwise along the length of the inflatable plug 22. The reinforcing straps can also comprise nylon straps or polyester straps. In another form of the invention where the inflatable plug 22 is to be subjected to high temperatures, the fabric material forming the inflatable plugs 22 can be Kevlar coated with Vyton.

Figure 7:
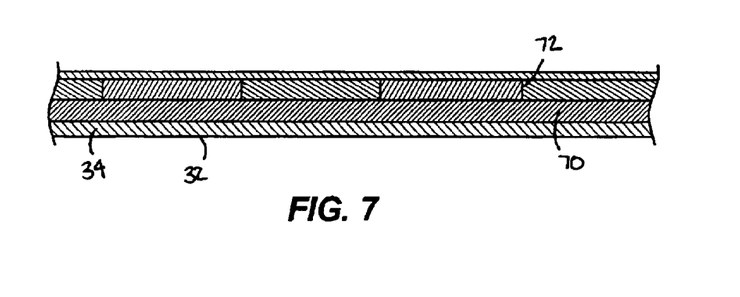
FIG. 7 is a partial cross-sectional view of a pipe sealing apparatus.

For example, in some constructions, such as the construction illustrated in FIG. 7, the inflatable plug 22 can include a first layer 70 of straps and a second layer 72 of straps. As shown in the illustrated construction, the first layer 70 can include one or more straps extending lengthwise along the length of the inflatable plug 22 and the second layer 72 can include straps The inflatable plug 22 can be assembled and manufactured as described in U.S. Pat. No. 5,901,752 and the disclosure of that patent is incorporated herein by reference.

Figure 3:
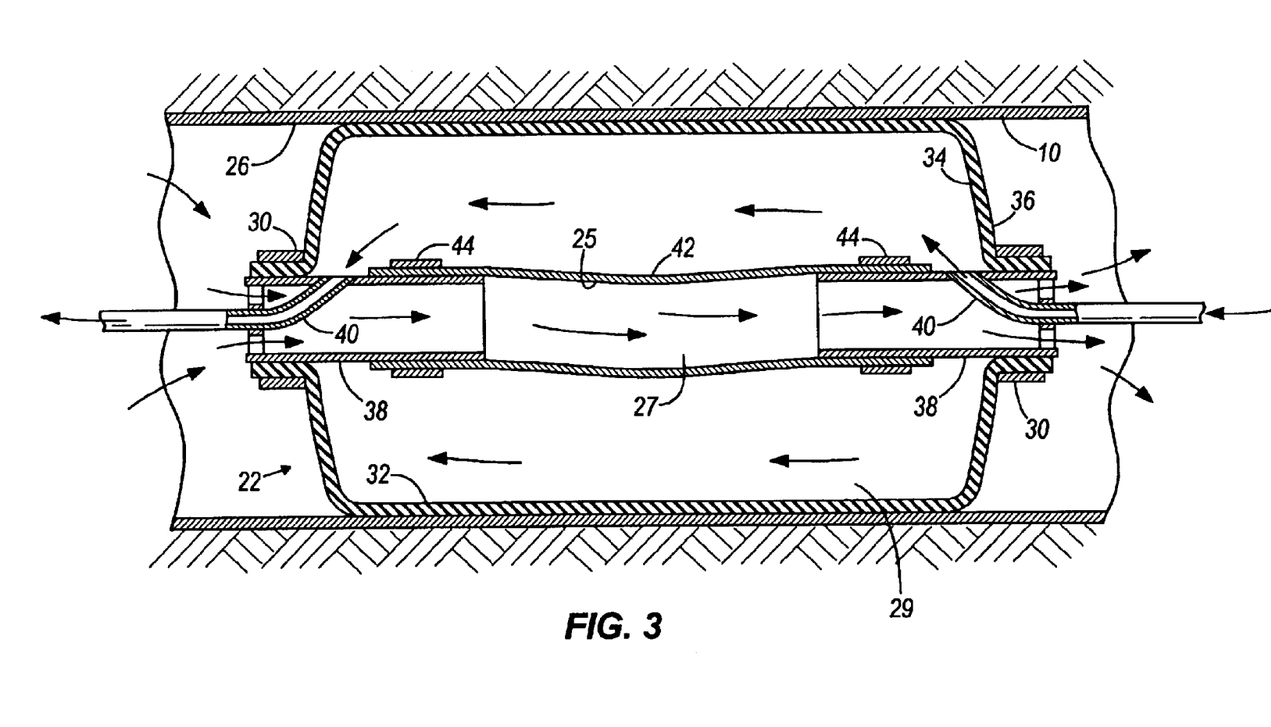
FIG. 3 is a view similar to FIG. 2.
Figure 4:
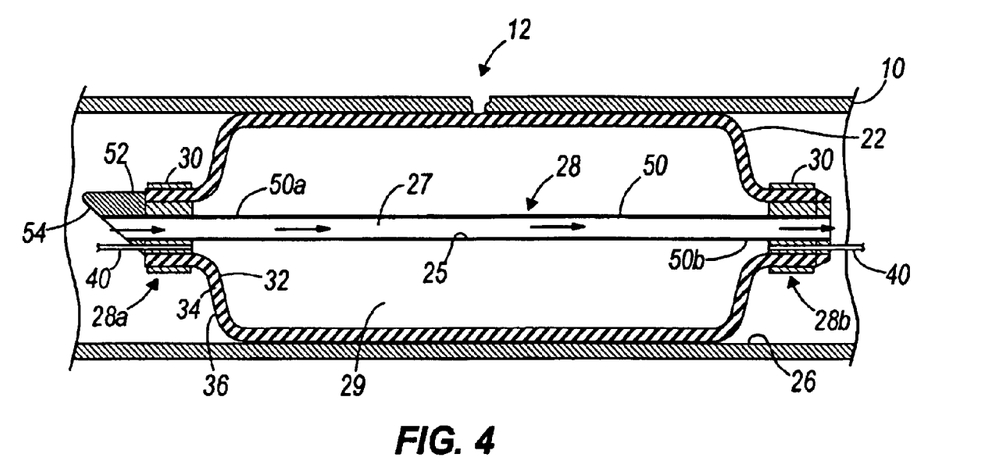
FIG. 4 is a cross-sectional elevation view of another pipe sealing apparatus, and shown inserted in a section of a pipeline and in an inflated state.

As shown in FIGS. 3 and 4, the inflatable plug 22 includes a support member 28 having a first end 28a and a second end 28b. The support member 28 can also include a longitudinally extending bore 25 to provide a fluid bypass or continuous conduit 27 for fluid to flow through the plug 22. In some constructions, the one or more fabric layers 34, the inner bladder layer 32, and/or the protective layer 36 can sealingly engage with the support member 28, and can form a sealed area or inflation chamber 29. For example, the ends of the fabric material layers 34 and/or the ends of the inner bladder layer 32 can wrap around the first end 28a and the second end 28b of the support member 28, and a metallic band or ring 30 can slidably be placed over the wrapped layers surrounding each end 28a and 28b of the support member 28. The band 30 can be swaged or deformed inwardly against each end 28a and 28b of the support member 28 to clamp the layers under high pressure against the support member 28.

In one construction, such as, for example, the construction shown in FIG. 3, the support member 28 can include a pair of high strength pipes 38 at opposite ends of the plug 22. In this construction, the ends of the fabric material layers 34 and the inner bladder layer 32 can wrap around the pipes 38, and the metallic band or ring 30 can slidably be placed over the wrapped layers surrounding each of the pipes 38. In some constructions, the ends of the fabric material layers 34, the inner bladder layer 32, and the protective layer 36 can wrap around each pipe 38. The band 30 can sealingly engage each pipe 38 with the wrapped ends of the outer layers 34, the inner bladder layer 32, and the protective layer 36, and can then be swaged or deformed inwardly against the high strength pipes 38 to clamp the fabric material under high pressure against the pipes 38.

In other constructions, such as, for example, the construction shown in FIG. 4, the support member 28 can include a bow stiffener 50 having a first end 50a and a second end 50b. In this construction, the ends of the fabric material layers 34, the inner bladder layer 32, and/or the protective layer 36 can wrap around the ends 50a and 50b of the bow stiffener 50, and the band 30 can slidably be placed over the wrapped layers surrounding the bow stiffener 50 in a similar fashion as described above. The bow stiffener 50 will be discussed in more detail below.

The inflatable plug 22 can also include one or more inflation hoses 40. In some constructions, the inflation hoses 40 can also be included in the support member 28. In some constructions, the one or more inflation hoses 40 can be disposed at one end of the plug 22. In other constructions, one or more inflation hoses 40 can be disposed at each end of the plug 22. As shown in FIG. 3, the inflation pipes 40 can be housed within the pipes 38 at the opposite ends of the plug 22 and can be welded in place. The inflation pipes 40 may extend through sidewalls of the pipes 38 to permit inflation of the interior or inflation chamber 29 of the plug 22.

In some constructions, the support member 28 can also include a flexible hose or conduit 42. In these constructions, the flexible hose 42 can connect the pipes 38 to each other. The flexible hose 42 can be secured to the pipes 38 by bands or clamps 44. The pipes 38 and flexible hose 42 can provide a continuous conduit 27 for fluid such that when the inflatable plug 22 is used in repairing the pipeline 10, natural gas or fluid can continue to flow through the plug 22 such that service to customers is not interrupted during the repair process. In one construction, the flexible hose 42 inside the flexible plug 22 can be comprised of a section of conventional hydraulic hose or a flexible hose comprising an internal coil spring to prevent the hose 42 from collapsing under pressure.

As mentioned previously, the inflatable plug 22 can include a bow stiffener 50. The bow stiffener 50 can be stiff yet bendable to allow the inflatable plug 22 to bend or bow around turns within the pipeline 10. In some constructions, the bow stiffener 50 can include a hose, a tube, a pipe, a rod, a bar, a combination of devices, or a similar device of a stiff yet flexible material, such as, for example, fiberglass, polyvinyl chloride ("PVC"), nylon, or the like. In some constructions, the support member 28 can include the bow stiffener 50, such as the construction illustrated in FIGS. 4 and 6. In other constructions, the bow stiffener 50 can be in addition to the support member 28. For example, in some constructions, the bow stiffener 50 can connect the high strength pipes 38 to each other rather than the flexible hose 42. In some constructions, the bow stiffener 50 can include a longitudinally extending bore 25 and can allow fluid to flow through the plug 22, such as the constructions shown in FIGS. 4 and 6. In other constructions, the bow stiffener 50 may not permit fluid to follow through the plug 22, may have a smaller radius than the high strength pipes 38 and hose 42, and may be positioned within the support member 38 (e.g., positioned within the pair of high strength pipes 38 and the flexible hose 42).

Figure 5:
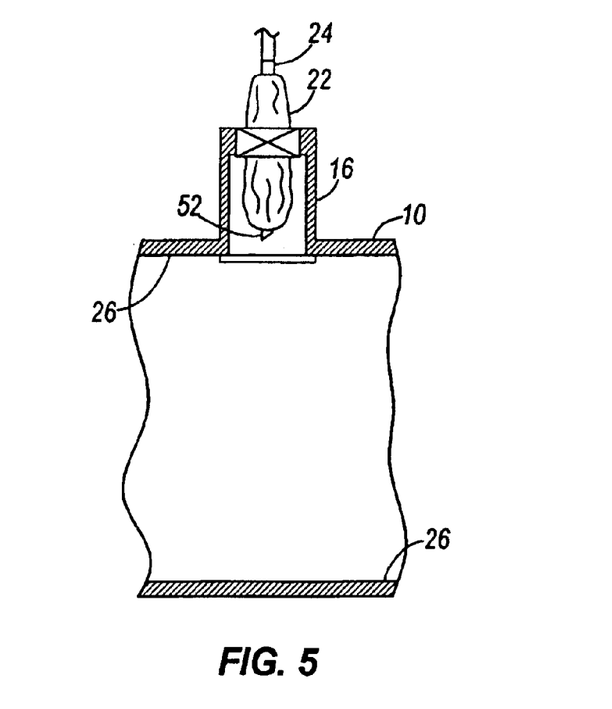
FIG. 5 is an elevation view of a pipe sealing apparatus, such as the pipe sealing apparatus shown in FIG. 4, and shown being inserted in a section of a pipeline.

In some constructions, such as the constructions shown in FIGS. 4 and 5, the inflatable plug 22 can include a shoe or boot 52 to bias the movement of the plug 22 within the pipeline 10. The shoe 52 can include an angled surface 54. As shown in FIG. 5, when the inflatable plug 22 is inserted into the pipeline 10 through a 90 degree transverse pipe 16, the angled surface 54 of the shoe 52 can bias the plug 22 in a certain direction when the shoe 52 comes in contact with the interior surface 26 of the pipeline 10. In the construction shown, the angled surface 54 of the shoe 52 is angled at approximately 45 degrees. In some constructions, the shoe 52 can be connected to the first end 28a or the second end 28b of the support member 28, such as in the construction shown in FIG. 4. In other constructions, the shoe 52 can be integral with the support member 28. For example, in the construction illustrated in FIG. 6, the shoe 52 can be part of the first end 50a of the bow stiffener 50.

Figure 6:
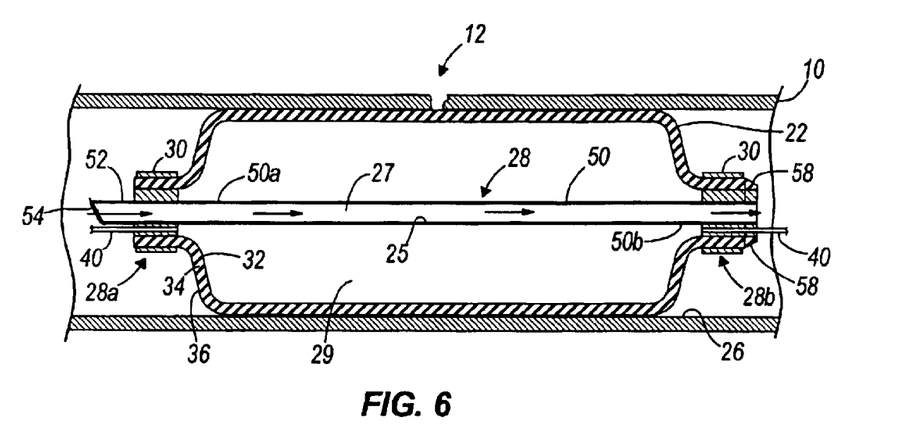
FIG. 6 is a cross-sectional elevation view of a further pipe sealing apparatus, and shown inserted in a section of a pipeline and in an inflated state.

In some constructions, the inflatable plug 22 may include a tapered end or surface. As shown in FIGS. 4 and 6, the second end 28b of the support member 28 can include a tapered surface 58 around the circumference of the second end 28b. The tapered surface 58 can allow the plug 22 better movement within the pipeline 10 around turns and bends.

In some constructions, during repair of a break 12 in the pipeline 10, two inflatable plugs 22 can be connected together in series and pushed into position on opposite sides of the repaired portion of the pipeline 10. The two inflatable plugs 22 can be inflated in place and then the area between the plugs 22 can be pressurized and the pressure in the area maintained to determine whether repair of the pipeline 10 as been successful.

In some constructions, the plug 22 may be used for low pressure blocking and testing of a pipeline 10 using a bulb type hand pump for inflation. Plugs 22 currently on the market require a higher pressure to expand the elastomer material used in moving or extruding the plug seal surface. While this invention allows higher pressure blocking or plugging, it may be inflated to the desired sealing diameter with a very low inflation pressure.

Various features of the invention are set forth in the following claims.

What is claimed is:

1. An apparatus for stopping a high pressurized fluid from escaping a rupture in a pipeline, the apparatus comprising:
    a support member having a first end, a second end, and an outer surface;
    an inner inflatable bladder sealingly engaging the first end and the second end of the support member and substantially covering the outer surface of the support member, the inner inflatable bladder comprising a material layer substantially impermeable to fluid;
    an outer material layer substantially encasing the inner inflatable bladder and sealingly engaging the first end and the second end of the support member, the outer material layer being formed of a woven fabric material capable of withstanding high inflation pressures of approximately 100 psi; and
    an inflation hose for supplying pressurized fluid between the outer surface of the support member and the inner inflatable bladder.

2. The apparatus as set forth in claim 1, and wherein the inner inflatable bladder comprises layer of a material substantially impermeable to fluid, the layer of material substantially impermeable to fluid being coated on the outer material layer.

3. The apparatus as set forth in claim 2, and wherein the layer of material substantially impermeable to fluid includes one of polyurethane, Nitrile, ethylene propylene (EPDM), neoprene, and Buna-N.

4. The apparatus as set forth in claim 1, and wherein the material layer substantially impermeable to fluid of the inner inflatable bladder includes one of polyurethane, Nitrile, ethylene propylene (EPDM), neoprene, and Buna-N.

5. The apparatus as set forth in claim 1, and wherein the outer material layer includes a first layer of woven fabric material and a second layer of woven fabric material, the second layer of woven fabric material substantially covering the first layer of woven fabric material.

6. The apparatus as set forth in claim 5, and wherein the first layer of woven fabric material and the second layer of woven fabric material each includes one of 400-Denier ballistic nylon and Kevlar.

7. The apparatus as set forth in claim 6, and further comprising a protective layer covering the second layer of woven fabric material.

8. The apparatus as set forth in claim 1, and further comprising a plurality of straps included in the outer material layer for reinforcing the outer material layer.

9. The apparatus as set forth in claim 1, and further comprising a first band positioned around the inner inflatable bladder and the outer material layer on the first end of the support member to sealingly engage the inner inflatable bladder and the outer material layer with the first end of the support member; and
    a second band positioned around the inner inflatable bladder and the outer material layer on the second end of the support member to sealingly engage the inner inflatable bladder and the outer material layer with the second end of the support member.

10. The apparatus as set forth in claim 1, and wherein the support member includes longitudinally extending bore to provide a fluid bypass through the apparatus.

11. The apparatus as set forth in claim 10, and wherein the support member comprises a first high strength pipe positioned at the first end of the support member, a second high strength pipe positioned at the second end of the support member, and a flexible hose connecting the first high strength pipe to the second high strength pipe.

12. The apparatus as set forth in claim 10, and wherein the support member comprises a bow stiffener having a first end and a second end, the bow stiffener having a longitudinally extending bore to provide a fluid bypass through the apparatus.

13. An apparatus for stopping a high pressurized fluid from escaping a rupture in a pipeline, the apparatus comprising;
    a support member having a first end, a second end, an outer surface and a bow stiffener, the bow stiffener having a first end, a second end and a longitudinally extending bore to provide a fluid bypass through the apparatus, and wherein one of the first end and the second end of the bow stiffener includes an angled surface for biasing movement of the apparatus within the pipeline;
    an inner inflatable bladder sealingly engaging the first end and the second end of the support member and substantially covering the outer surface of the support member, the inner inflatable bladder comprising a material layer substantially impermeable to fluid;
    an outer material layer substantially encasing the inner inflatable bladder and sealingly engaging the first end and the second end of the support member, the outer material layer being formed of a woven fabric material capable of withstanding high inflation pressures of approximately 100 psi; and
    an inflation hose for supplying pressurized fluid between the outer surface of the support member and the inner inflatable bladder.

14. An apparatus for stopping a high pressurized fluid from escaping a rupture in a pipeline, the apparatus comprising:
    a support member having a first end, a second end, an outer surface and a bow stiffener having a first end and a second end, the bow stiffener having a longitudinally extending bore to provide a fluid bypass through the apparatus;
    an inner inflatable bladder sealingly engaging the first end and the second end of the support member and substantially covering the outer surface of the support member, the inner inflatable bladder comprising a material layer substantially impermeable to fluid;
    an outer material layer substantially encasing the inner inflatable bladder and sealingly engaging the first end and the second end of the support member, the outer material layer being formed of a woven fabric material capable of withstanding high inflation pressures of approximately 100 psi:
    an inflation hose for supplying pressurized fluid between the outer surface of the support member and the inner inflatable bladder; and
    a shoe positioned at one of the first end of the support member and the second end of the support member, the shoe having an angled surface for biasing the movement of the apparatus within the pipeline.

15. An apparatus for stopping a high pressurized fluid from escaping a rupture in a pipeline, the apparatus comprising:

a support member having a first end, a second end, and an outer surface;

an inner inflatable bladder sealingly engaging the first end and the second end of the support member and substantially covering the outer surface of the support member, the inner inflatable bladder comprising a material layer substantially impermeable to fluid;

an outer material layer substantially encasing the inner inflatable bladder and sealingly engaging the first end and the second end of the support member, the outer material layer being formed of a woven fabric material capable of withstanding high inflation pressures of approximately 100 psi;

an inflation hose for supplying pressurized fluid between the outer surface of the support member and the inner inflatable bladder; and a shoe positioned at one of the first end of the support member and the second end of the support member, the shoe having an angled surface for biasing the movement of the apparatus within the pipeline.

16. The apparatus as set forth in claim 1, and further comprising a curable material patch positioned on the outer material layer to be forced against the rupture in the pipeline when the inner inflatable bladder is inflated and the apparatus is positioned over the rupture in the pipeline.

17. The apparatus as set forth in claim 1, and further comprising a protective layer coated on the outer material layer.

18. The apparatus as set forth in claim 17, wherein the protective layer includes one of polyurethane, Nitrile, ethylene propylene (EPDM), neoprene, and Buna-N.

19. A method of plugging a high pressure natural gas pipeline to prevent natural gas from escaping a rupture in the pipeline, the method comprising:

inserting a plug into the pipeline through an opening in the pipeline;

positioning the plug within the pipeline such that the plug is substantially over the rupture in the pipeline; and inflating the plug to an inflation pressure of at least 100 psi such that the plug engages against the rupture when the plug is inflated.

20. The method as set forth in claim 19, and further comprising tapping the pipeline either upstream or downstream of the rupture in the pipeline to create an opening in the pipeline.

21. The method as set forth in claim 19, and further comprising positioning a saddle on the pipeline either upstream or downstream of the rupture in the pipeline.

22. The method as set forth in claim 19, and attaching a transverse pipe to a saddle.

23. An apparatus for stopping a high pressurized fluid from escaping a rupture in a pipeline, the apparatus comprising:

a bow stiffener having a first end, a second end, and an outer surface;

a shoe positioned at one of the first end of the bow stiffener and the second end of the bow stiffener, the shoe having an angled surface for biasing movement of the apparatus within the pipeline;

an inner inflatable bladder sealingly engaging the first end and the second end of the support member and substantially covering the outer surface of the support member, the inner inflatable bladder comprising a material layer substantially impermeable to fluid;

an outer material layer substantially encasing the inner inflatable bladder and sealingly engaging the first end and the second end of the support member, the outer material layer being formed of a woven fabric material capable of withstanding high inflation pressures of approximately 100 psi; and an inflation hose for supplying pressurized fluid between the outer surface of the support member and the inner inflatable bladder.

24. The apparatus as set forth in claim 23, and further comprising a protective layer coated on the outer material layer.

25. The apparatus as set forth in claim 24, wherein the protective layer includes one of polyurethane, Nitrile, ethylene propylene (EPDM), neoprene, and Buna-N.

26. The apparatus as set forth in claim 23, and wherein the outer material layer includes a first layer of woven fabric material and a second layer of woven fabric material, the second layer of woven fabric material substantially covering the first layer of woven fabric material.

27. The apparatus as set forth in claim 26, and wherein the first layer of woven fabric material and the second layer of woven fabric material each includes one of 400-Denier ballistic nylon and Kevlar.

28. The apparatus as set forth in claim 23, and wherein the material layer substantially impermeable to fluid of the inner inflatable bladder includes one of polyurethane, Nitrile, ethylene propylene (EPDM), neoprene, and Buna-N.

* * * * *